(12) United States Patent  
Shinzato

(10) Patent No.: US 8,788,521 B2  
(45) Date of Patent: Jul. 22, 2014

(54) INFORMATION PROCESSING DEVICE, INFORMATION PROCESSING METHOD, PROGRAM FOR INFORMATION PROCESSING DEVICE, AND RECORDING MEDIUM

(75) Inventor: Keiji Shinzato, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 0 days.

(21) Appl. No.: 14/131,535

(22) PCT Filed: Jun. 29, 2012

(86) PCT No.: PCT/JP2012/066749  
§ 371 (c)(1),  
(2), (4) Date: Jan. 8, 2014

(87) PCT Pub. No.: WO2013/046838  
PCT Pub. Date: Apr. 4, 2013

(65) Prior Publication Data  
US 2014/0143237 A1    May 22, 2014

(30) Foreign Application Priority Data  
Sep. 29, 2011   (JP) .................................. 2011-215411

(51) Int. Cl.  
*G06F 17/30*   (2006.01)

(52) U.S. Cl.  
CPC ...... *G06F 17/30011* (2013.01); *G06F 17/3005* (2013.01); *G06F 17/30023* (2013.01); *G06F 17/30861* (2013.01)  
USPC ........... 707/769; 707/722; 707/767; 707/765; 707/759; 709/201; 709/203; 709/213; 709/217

(58) Field of Classification Search  
CPC .................... G06F 17/30011; G06F 17/30861; G06F 17/30023; G06F 17/3005  
USPC .......... 707/722, 767, 765, 759; 709/201, 203, 709/213, 217  
See application file for complete search history.

(56) References Cited

U.S. PATENT DOCUMENTS

| 7,054,860 | B2 * | 5/2006 | Inaba et al. ........................... 1/1 |
| 7,243,300 | B1 * | 7/2007 | Metcalfe et al. ............... 715/201 |
| 8,086,048 | B2 * | 12/2011 | Naaman et al. ................ 382/225 |
| 8,356,024 | B2 * | 1/2013 | Mintz ........................... 707/706 |

(Continued)

FOREIGN PATENT DOCUMENTS

| JP | 63-78228 A | 4/1988 |
| JP | 05-314181 A | 11/1993 |

(Continued)

OTHER PUBLICATIONS

International Search Report of PCT/JP2012/066749 dated Sep. 18, 2012.

(Continued)

*Primary Examiner* — Frantz Coby  
(74) *Attorney, Agent, or Firm* — Sughrue Mion, PLLC

(57) ABSTRACT

A first word is acquired (S1), a plurality of relevant words associated with the acquired first word and containing a character string of the first word are generated (S3, S4), search results using the generated relevant words as search keywords are acquired (S5, S6), and search result information 40 is generated so as to display a search result 42 on a screen of a displaying means in accordance with each of the relevant words (S7, S8).

9 Claims, 12 Drawing Sheets

(56) References Cited

U.S. PATENT DOCUMENTS

| | | | |
|---|---|---|---|
| 8,396,850 B2* | 3/2013 | Schneider | 707/706 |
| 2005/0160166 A1* | 7/2005 | Kraenzel | 709/224 |
| 2007/0162329 A1* | 7/2007 | Lee | 705/14 |
| 2007/0282828 A1* | 12/2007 | Ikenoue | 707/5 |
| 2009/0216752 A1* | 8/2009 | Terui et al. | 707/5 |
| 2010/0223268 A1* | 9/2010 | Papakonstantinou et al. | 707/749 |
| 2010/0223273 A1* | 9/2010 | Schneider | 707/758 |
| 2011/0144995 A1* | 6/2011 | Bangalore et al. | 704/251 |
| 2012/0185466 A1* | 7/2012 | Yamasaki et al. | 707/722 |

FOREIGN PATENT DOCUMENTS

| | | |
|---|---|---|
| JP | 2002-318814 A | 10/2002 |
| JP | 2008-192110 A | 8/2008 |
| JP | 2009-093648 A | 4/2009 |
| JP | 2009-134656 A | 6/2009 |

OTHER PUBLICATIONS

Japanese Office Action of Japanese Patent Application No. 2013-510161 dated May 21, 2013.

* cited by examiner

| FIRST WORD | SECOND WORD | NUMBER |
|---|---|---|
| JITENSHA (BICYCLE) | | ... |
| JITENSHA (BICYCLE) | HERUMETTO (HELMET) | ... |
| JITENSHA (BICYCLE) | RAITO (LIGHT) | ... |
| JITENSHA (BICYCLE) | KODOMO (CHILD) | ... |
| ⋮ | ⋮ | ⋮ |
| BOUSAI (DISASTER PREVENTION) | HERUMETTO (HELMET) | ... |
| KODOMO (CHILD) | HERUMETTO (HELMET) | ... |
| ⋮ | ⋮ | ⋮ |
| JITENSHA YOU HERUMETTO (HELMET FOR BICYCLE) | | ... |
| ⋮ | ⋮ | ⋮ |
| KODOMO YOU JITENSHA (BICYCLE FOR CHILDREN) | | ... |
| ⋮ | ⋮ | ⋮ |

FIG.3

INFORMATION PROCESSING DEVICE, INFORMATION PROCESSING METHOD, PROGRAM FOR INFORMATION PROCESSING DEVICE, AND RECORDING MEDIUM

CROSS REFERENCE TO RELATED APPLICATIONS

This is a National Stage of International Application No. PCT/JP2012/066749 filed Jun. 29, 2012, claiming priority based on Japanese Patent Application No. 2011-215411 filed Sep. 29, 2011, the contents of all of which are incorporated herein by reference in their entirety.

TECHNICAL FIELD

The present invention relates to technical fields of an information processing device for generating a search result by a search keyword, an information processing method, a program for an information processing device, and a recording medium.

BACKGROUND ART

Search systems that list and display a search result based on a search keyword in a Web page or the like have been known. For example, Patent Document 1 discloses a product search method that lists product images searched for based on a keyword to make the comparison of product easier.

CITATION LIST

Patent Document

Patent Document 1: Japanese Patent Application Laid-Open (JP-A) No. 2002-318814

SUMMARY OF THE INVENTION

Problem to be Solved by the Invention

However, according to conventional technology like Patent Document 1, when a search for product or the like is conducted based on some search keyword (for example, "JITEN-SHA" (bicycle)), a search result that may be obtained because not only product as a main body, but also accessories (for example, "JITENSHA YOU HERUMETTO, JITENSHA YOU RAITO" (helmet for bicycle, light for bicycle") thereof are mixed.

The present invention has been made in view of the problem, and an exemplary object thereof is to provide an information processing capable of reducing mixture of targets associated with a word (such as targets to be searched by a search keyword) for display.

Means for Solving the Problem

In order to solve the above problem, an aspect of a preferred embodiment includes a first word acquiring means that acquires a first word, a relevant word generating means that generates a plurality of relevant words associated with the first word acquired by the first word acquiring means and containing a character string of the first word, a search result acquiring means that acquires a search result using the relevant word generated by the relevant word generating means as a search keyword, and a search result information generating means that generates search result information so as to display the search result acquired by the search result acquiring means on a screen of a displaying means in accordance with each of the relevant words.

Another aspect of a preferred embodiment is characterized in that the search result acquiring means acquires a first search result using the first word as a search keyword, and a second search result using the relevant word generated by the relevant word generating means as a search keyword, and the search result information generating means generates search result information so as to discriminate and display at least part of the first search result acquired by the search result acquiring means and the second search result associated with the relevant word on the screen of the displaying means.

Another aspect is characterized in that the relevant word generating means has a relevant word candidate generating means that generates candidates of the relevant words from the first word, and a relevant word determining means that determines the relevant word from the candidates.

Another aspect is characterized in that the relevant word determining means finds a number of shops which contain a candidate of the relevant words generated by the relevant word candidate generating means in an explanation of a product and sell the product, and determines the relevant word in accordance with the number of shops.

Yet another aspect is characterized in that the relevant word determining means determines the relevant word in accordance with a number of appearances at which the first word appears in a predetermined database.

Another aspect of a preferred embodiment is characterized in that the relevant word determining means determines the relevant word in accordance with a number of hit searches with a candidate of the relevant words generated by the relevant word candidate generating means as a search keyword.

Another aspect of a preferred embodiment is characterized in that the information processing device includes a second word acquiring means that acquires a second word different from the first word and the relevant word candidate generating means generates the candidates containing a combination of a character string of the first word and a character string of the second word.

Another aspect of a preferred embodiment is characterized in that the relevant word candidate generating means generates the candidates by intermediate characters between the first word and the second word, and the search result information generating means generates the search result information so as to group and display the second search result per intermediate character on the screen of the displaying means.

A further aspect of a preferred embodiment is characterized in that the search result information generating means generates search result information so as to display, as at least part of the first search result, a search result in which the second search result is removed from the first search result.

In an information processing method for an information processing device for processing information, one embodiment is characterized in that the information processing method includes a first word acquiring step of acquiring a first word, a relevant word generating step of generating a plurality of relevant words associated with the first word acquired in the first word acquiring step and containing a character string of the first word, a search result acquiring step of acquiring a search result using the relevant word generated in the relevant word generating step as a search keyword, and a search result information generating step of generating search result information so as to display the search result acquired in the search result acquiring step on a screen of a displaying means in accordance with each of the relevant words.

Another aspect of a preferred embodiment is characterized in that a computer is caused to function as a first word acquiring means that acquires a first word, a relevant word generating means that generates a plurality of relevant words associated with the first word acquired by the first word acquiring means and containing a character string of the first word, a search result acquiring means that acquires a search result using the relevant word generated by the relevant word generating means as a search keyword, and a search result information generating means that generates search result information so as to display the second search result acquired by the search result acquiring means on a screen of a displaying means in accordance with each of the relevant words.

In a computer-readably recorded program for an information processing device according to a preferred embodiment, the program causes a computer to function as a first word acquiring means that acquires a first word, a relevant word generating means that generates a plurality of relevant words associated with the first word acquired by the first word acquiring means and containing a character string of the first word, a search result acquiring means that acquires a search result using the relevant word generated by the relevant word generating means as a search keyword, and a search result information generating means that generates search result information so as to display the search result acquired by the search result acquiring means on a screen of a displaying means in accordance with each of the relevant words.

Effect of the Invention

According to the present invention, it is possible to reduce mixture of targets associated with a word for display.

BRIEF DESCRIPTION OF THE DRAWINGS

FIG. 3 is a schematic diagram illustrating exemplary query logs stored in a query log database of FIG. 2.

MODES FOR CARRYING OUT THE INVENTION

An embodiment according to the present invention will be described below with reference to the drawings. The embodiment described later is where the present invention is applied to an information processing system.

[1. Structure and Functional Outline of Information Processing System]

Figure 1:
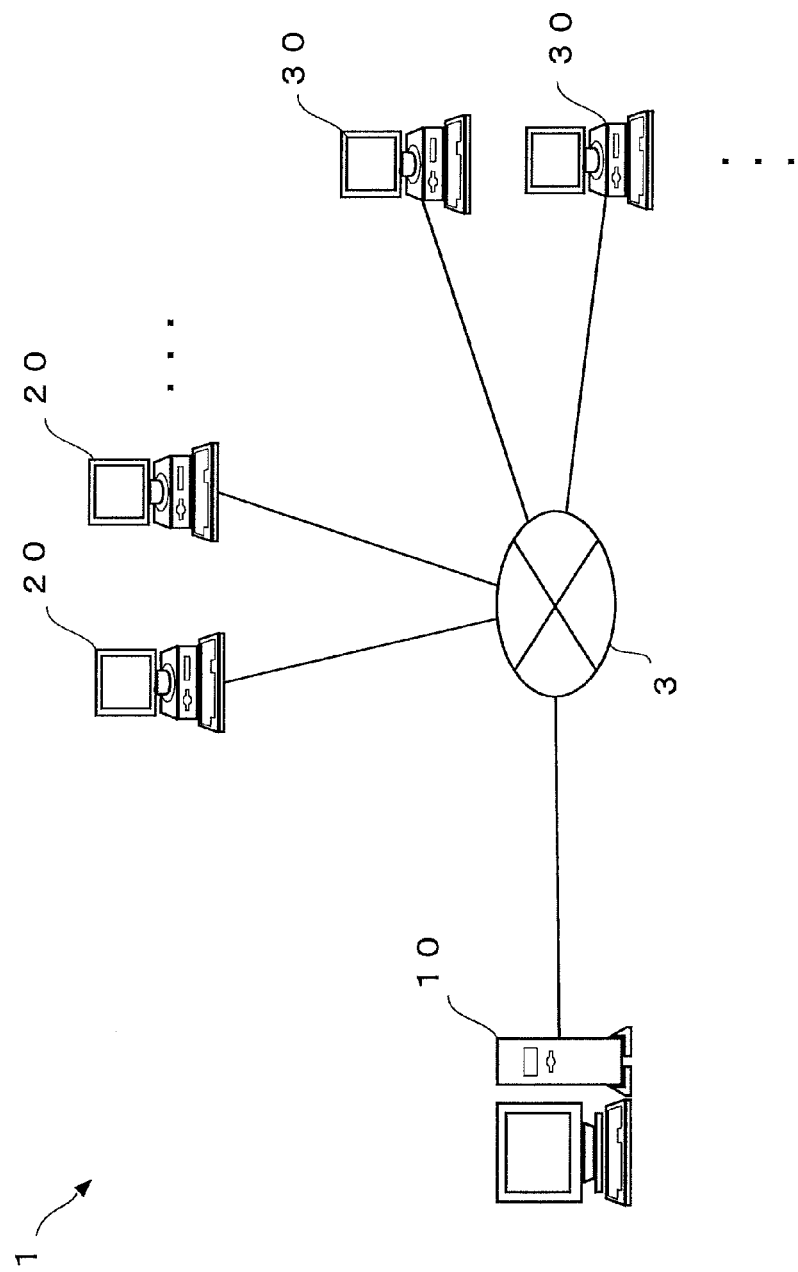
FIG. 1 is a schematic diagram illustrating an exemplary outline structure of an information processing system according to an embodiment of the present invention.

A structure and outline functions of the information processing system according to one embodiment of the present invention will be first described using FIG. 1.

FIG. 1 is a schematic diagram illustrating an exemplary outline structure of an information processing system 1 according to the present embodiment.

As illustrated in FIG. 1, the information processing system 1 comprises an information processing server 10 (exemplary information processing device) installed for managing a shopping site, a shop terminal device 20 at a shop providing products on the shopping site, a user terminal device 30 of a user who purchases on the shopping site.

The information processing server 10, the shop terminal device 20 and the user terminal device 30 can mutually exchange data via a network 3 by use of TCP/IP or the like as a communication protocol. Incidentally, the network 3 is constructed of the Internet, a dedicated communication line (such as CATV (Community Antenna Television) line), a mobile communication network (including base station or the like), a gateway, or the like, for example.

The shop terminal device 20 is a computer of a provider who provides products on a shopping site. The provider registers products to be sold in the shop terminal device 20. The shop terminal device 20 has a web browser function, and displays the products to be sold, and the like.

The user terminal device 30 is a computer of a user who purchases a product on the shopping site. The user terminal device 30 has a web browser function, and when the user searches a product, transmits a search query to the information processing server 10 or displays a search result or advertisement on a screen of the web browser.

[2. Structures and Functions of Information Processing Server and Each Terminal Device]

(2.1 Structure and Functions of Information Processing Server 10)

A structure and functions of the information processing server 10 will be described using FIGS. 2 and 3.

Figure 2:
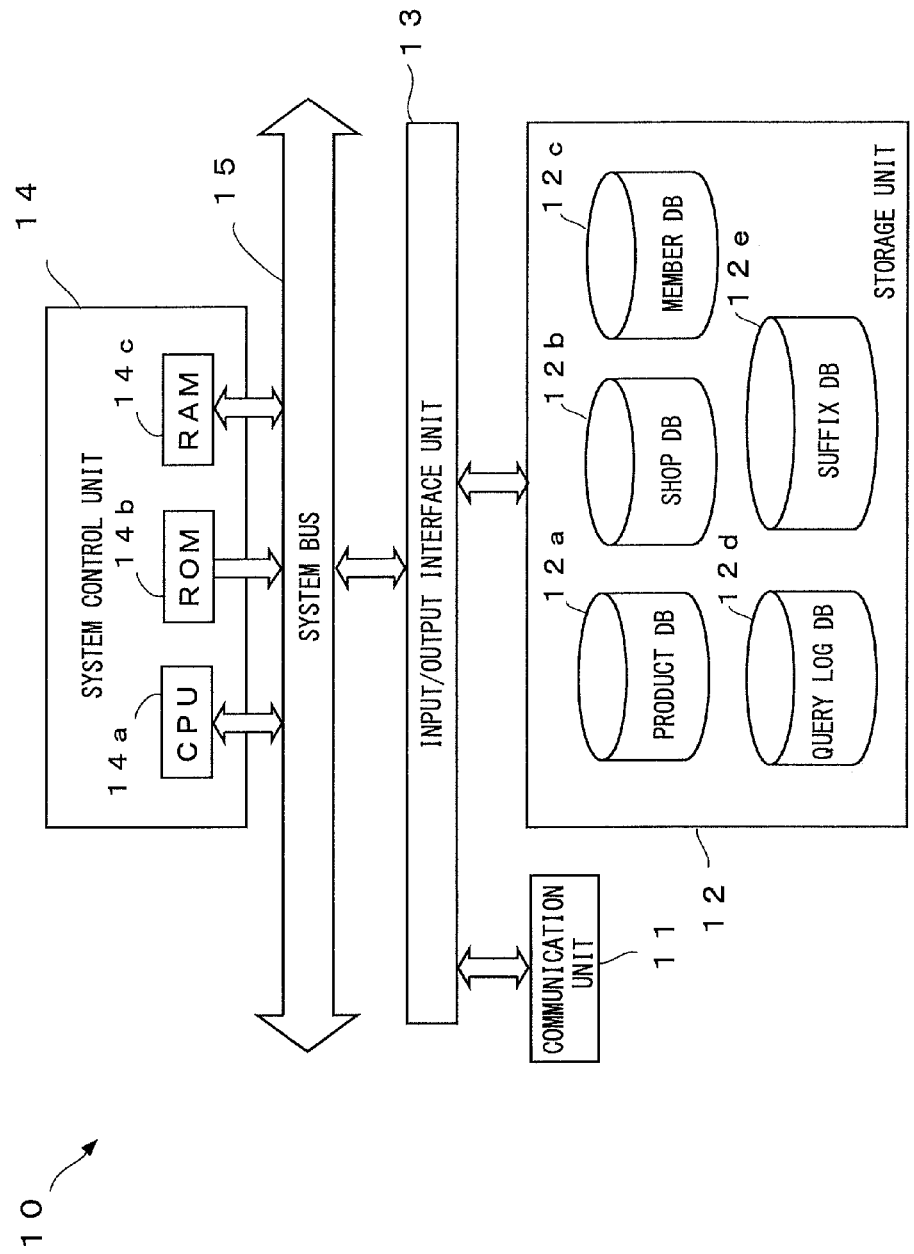
FIG. 2 is a block diagram illustrating an exemplary outline structure of an information processing server of FIG. 1.

FIG. 2 is a block diagram illustrating an exemplary outline structure of the information processing server 10. FIG. 3 is a schematic diagram illustrating exemplary query logs stored in a query log database.

As illustrated in FIG. 2, the information processing server 10 comprises a communication unit 11, a storage unit 12, an input/output interface unit 13, and a system control unit 14. The system control unit 14 and the input/output interface unit 13 are connected to each other via a system bus 15.

The communication unit 11 is connected to the network 3 and is directed for controlling a communication state with the shop terminal device 20 or the user terminal device 30.

The storage unit 12 is configured of a hard disk drive or the like, for example, and stores therein various programs such as operating system and server programs, or web pages' files described in a markup language such as HTML. Incidentally, various programs may be acquired from other server device or the like, for example, via the network 3, or may be recorded in a recording medium and read via a drive device.

The storage unit 12 constructs therein, as exemplary predetermined databases, a product database 12a (hereinafter referred to as "product DB 12a"), a shop database 12b (hereinafter referred to as "shop DB 12b"), a member database 12c (hereinafter referred to as "member DB 12c"), a query log database 12d (hereinafter referred to as "query log DB 12"), a suffix database 12e (hereinafter referred to as "suffix DB 12e"), and the like.

The product DB 12a stores therein product information such as product name, type, product image, specification and summarized product introduction, advertisement information, and the like, in association with a product ID as an identifier for identifying a product. The product DB 12a stores therein a shop ID of a shop selling a product in association with a product ID. The product DB 12a further stores therein product web pages' files described in a markup language such as HTML or XML. The product DB 12a constructs therein a search database enabling a product to be searched by a search keyword.

The shop DB 12b registers therein shop information such as shop ID, name, address, phone number and product information on products sold by a shop. The shop information can be determined per seller by a shop ID. The product ID of a product sold by a shop and the shop ID are associated to be stored in the shop DB 12b.

The member DB 12c registers therein user information such as user ID of a member-registered user (shopping site user), name, address, phone number, e-mail address, occupation, hobby, purchase history, and user's interested theme or genre. The member DB 12c registers therein user ID, log-in ID, and password required by the user for logging in a shopping site from the user terminal device 30. Herein, the log-in ID and the password are log-in information used in a log-in processing (user authentication processing).

The query log DB 12d stores therein search keywords used by the user for searching the product DB 12a. As illustrated in FIG. 3, the query log DB 12d stores therein search keywords used for search, and the number of times of use. Further, as illustrated in FIG. 3, when search words used for search are "JITENSHA HERUMETTO" (bicycle helmet), assuming "JITENSHA" (bicycle) as a first word and "HERUMETTO" (helmet)"HERUMETTO" (helmet) as a second word, the search keywords are stored in the query log DB 12d in a combination of the first word and the second word. Incidentally, when a search keyword used for search is "JITENSHA" (bicycle), only the first word is stored. Also when search keywords used for search are "HERUMETTO JITENSHA" (helmet bicycle), "JITENSHA" (bicycle) as a first word and "HERUMETTO" (helmet) as a second word are arranged and stored in the query log DB 12d.

The suffix DB 12e stores therein "YOU" (for), "TSUKI" (with)"TSUKI" (with), "SEI" (made of), "SAN" (produced in), "型", "BAN" (board), "BAN" (version), "GARA" (pattern), "IRO" (color) and the like as suffix characters which are exemplary intermediate characters between the first word and the second word. For example, a suffix character is used for generating a relevant word such as "JITENSHA YOU HERUMETTO" (helmet for bicycle). Incidentally, in English, "with", "in", "for the purpose of", and the like may be the suffix characters in addition to "for" in "helmet for bicycle".

Herein, the relevant words relate to the first word and contain a character string of the first word. For example, when the first word is "JITENSHA" (bicycle), its relevant words may be "JITENSHA YOU HERUMETTO" (helmet for bicycle), "JITENSHA HERUMETTO" (bicycle-helmet), "KODOMO YOU JITENSHA" (bicycle for children), "KODOMOJITENSHA" (children-bicycle), "JITENSHA" (bicycle) itself, and the like. In English, when the first word is "bicycle", its relevant words may be "helmet for bicycle", "bicycle-helmet", "bicycle" itself, and the like. In this way, a relevant word itself contains the first word.

The input/output interface unit 13 performs an interface processing between the communication unit 11 as well as the storage unit 12 and the system control unit 14.

The system control unit 14 is configured of a CPU (Central Processing Unit) 14a, a ROM (Read Only Memory) 14b, a RAM (Random Access Memory) 14c, and the like. The CPU 14a reads and executes various programs stored in the ROM 14b or the storage unit 12 so that the system control unit 14 functions as a relevant word generating means that generates a plurality of relevant words associated with a first word and containing a character string of the first word, or a search result information generating means.

(2.2 Structure and Functions of Shop Terminal Device 20)

A structure and functions of the shop terminal device 20 will be described using FIG. 4.

Figure 4:
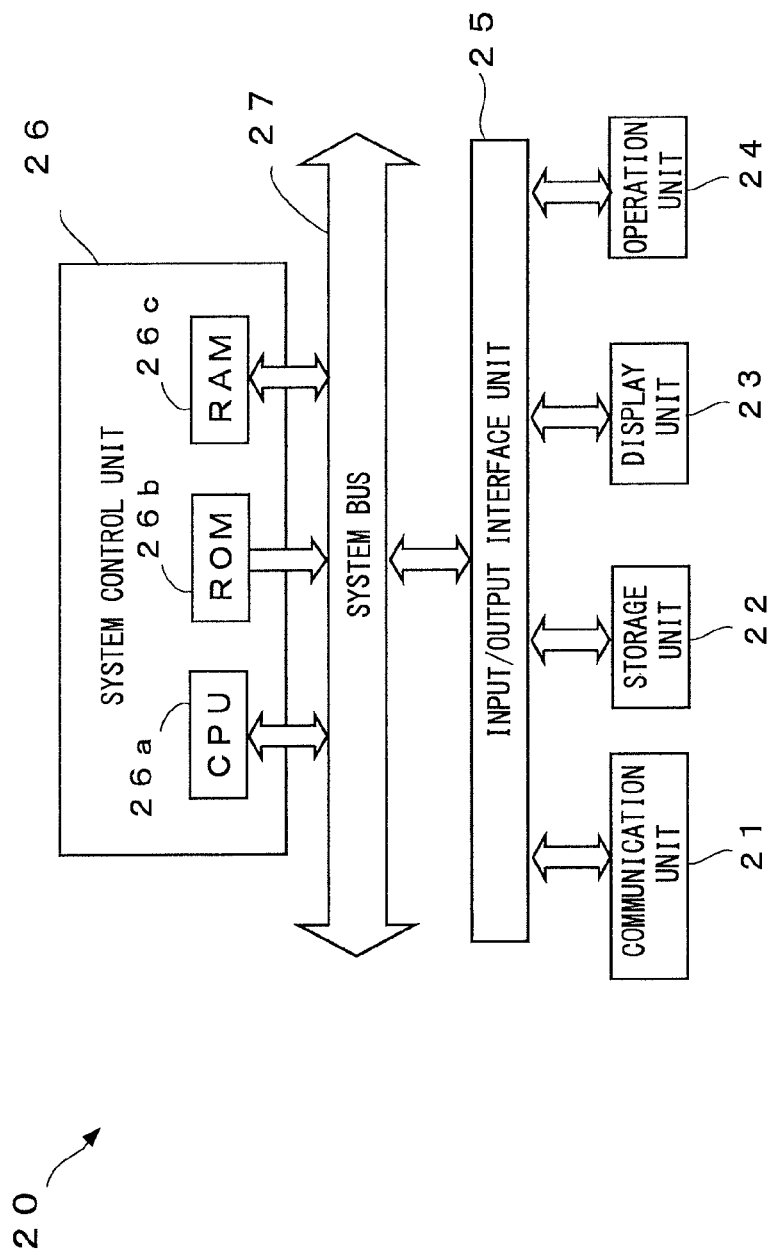
FIG. 4 is a block diagram illustrating an exemplary outline structure of a shop terminal device of FIG. 1.

FIG. 4 is a block diagram illustrating an exemplary outline structure of the shop terminal device 20.

As illustrated in FIG. 4, the shop terminal device 20 functioning as a computer is a personal computer, a portable wireless phone including a smartphone, a portable terminal such as PDA, or the like, and comprises a communication unit 21, a storage unit 22, a display unit 23, an operation unit 24, an input/output interface unit 25, and a system control unit 26. The system control unit 26 and the input/output interface unit 25 are connected to each other via a system bus 27.

The communication unit 21 controls communication with the information processing server 10 or the like via the network 3. Incidentally, when the shop terminal device 20 is a portable terminal device, the communication unit 21 has a wireless communication function of connecting to a mobile communication network of the network 3.

The storage unit 22 is configured of a hard disk drive or the like, for example, and stores therein programs for operating system and web browser, programs for web browser's tool bar, and the like.

The display unit 23 (exemplary displaying means) is configured of a liquid crystal display device, EL (Electro Luminescence) device, or the like, for example.

The operation unit 24 is configured of a keyboard, a mouse, or the like, for example. The user inputs a response via the operation unit 24. Incidentally, when the display unit 23 is a display panel in a touch-switch system such as touch panel, the operation unit 24 acquires position information on the display unit 23 contacted or closed by the user.

The input/output interface unit 25 is an interface between the communication unit 21 as well as storage unit 22 and the system control unit 26.

The system control unit 26 has a CPU 26a, a ROM 26b, a RAM 26c, and the like, for example. The system control unit 26 is such that the CPU 26a reads and executes various programs stored in the ROM 26b, the RAM 26c, or the storage unit 22. For example, the system control unit 26 executes a program for web browser and functions as a web browser.

(2.3 Structure and Functions of User Terminal Device 30)

A structure and functions of the user terminal device 30 will be described using FIG. 5.

Figure 5:
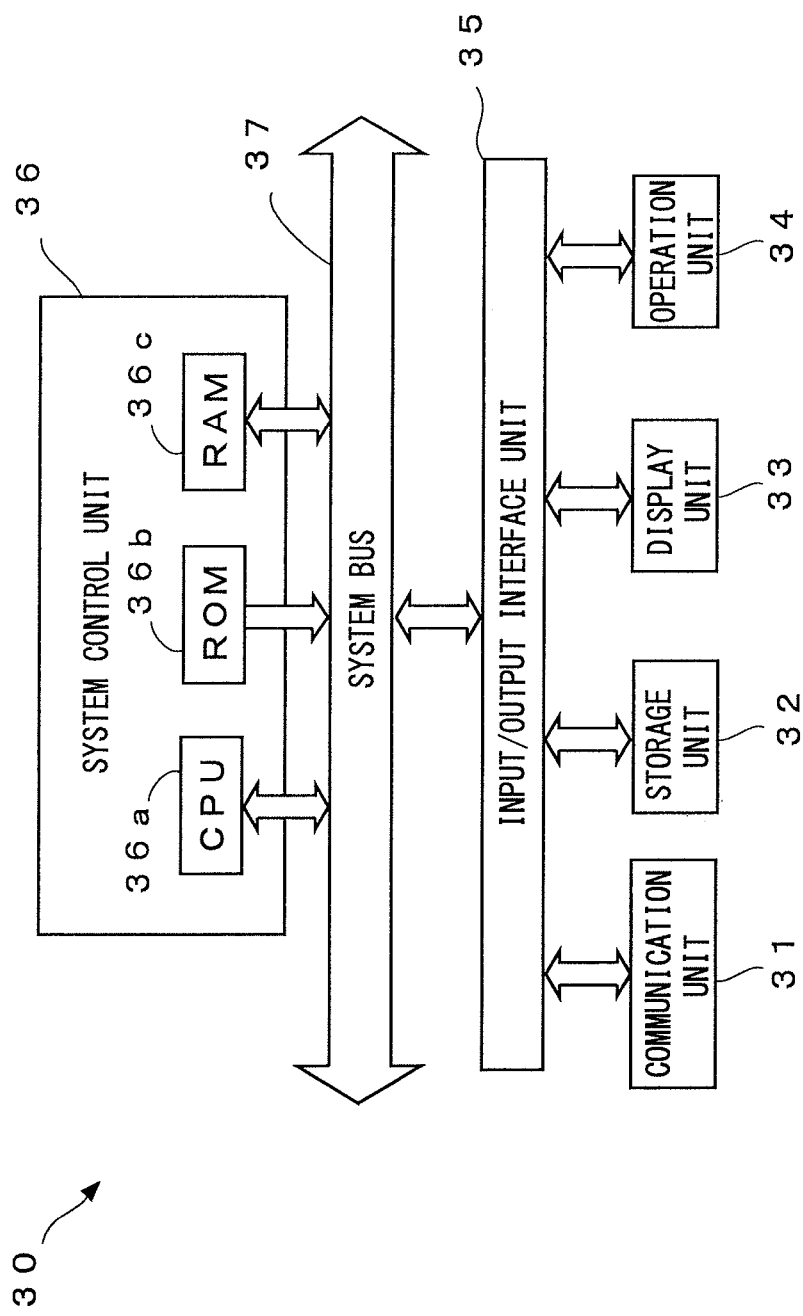
FIG. 5 is a block diagram illustrating an exemplary outline structure of a user terminal device of FIG. 1.

FIG. 5 is a block diagram illustrating an exemplary outline structure of the user terminal device 30.

As illustrated in FIG. 5, the user terminal device 30 functioning as a computer is a personal computer, a portable wireless phone including a smartphone, a portable terminal such as PDA, or the like similarly to the shop terminal device 20, and comprises a communication unit 31, a storage unit 32, a display unit 33 (exemplary displaying means), an operation unit 34, an input/output interface unit 35, and a system control unit 36. The system control unit 36 and the input/output interface unit 35 are connected to each other via a system bus 37. Incidentally, the structure and functions of the user terminal device 30 are substantially the same as the structure and functions of the shop terminal device 20, and thus details thereof will be omitted. Incidentally, the display unit 33 displays a web page for searching a product or a web page of search results by the web browser.

[3. Operations of Information Processing System]

The operations of the information processing system 1 according to the embodiment of the present invention will be described using FIGS. 6 to 9.

Figure 6:
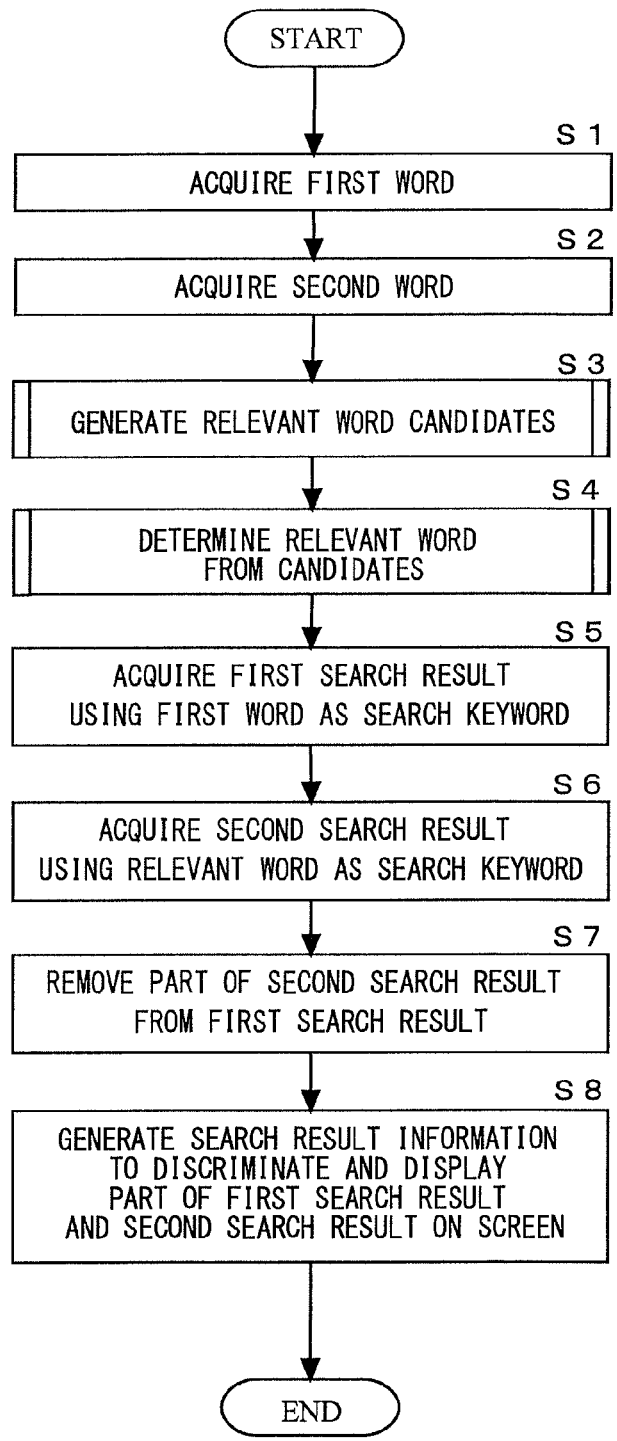
FIG. 6 is a flowchart illustrating exemplary operations of the information processing server of FIG. 1.
Figure 7:
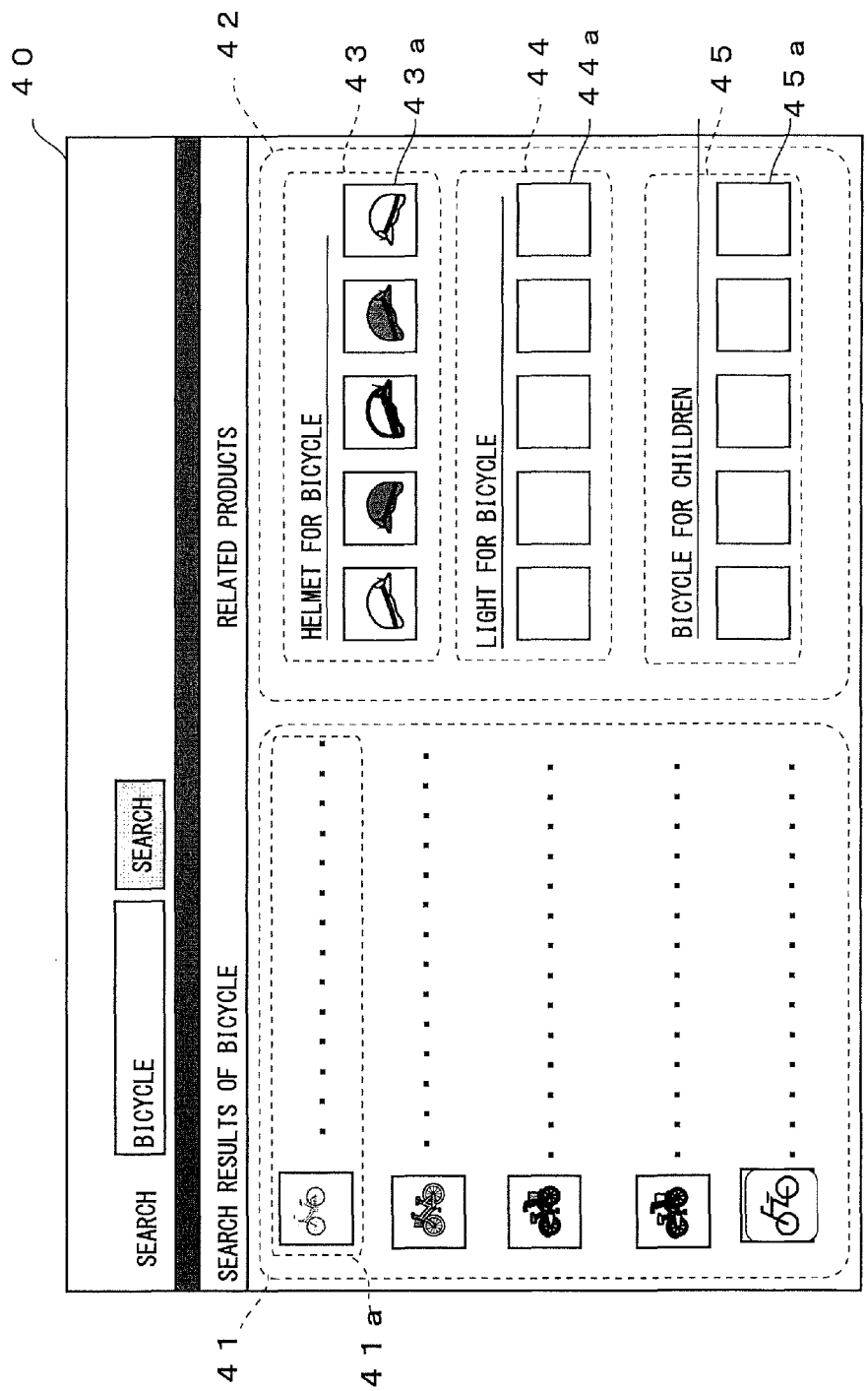
FIG. 7 is a schematic diagram illustrating exemplary search results by the information processing server of FIG. 1.
Figure 8:
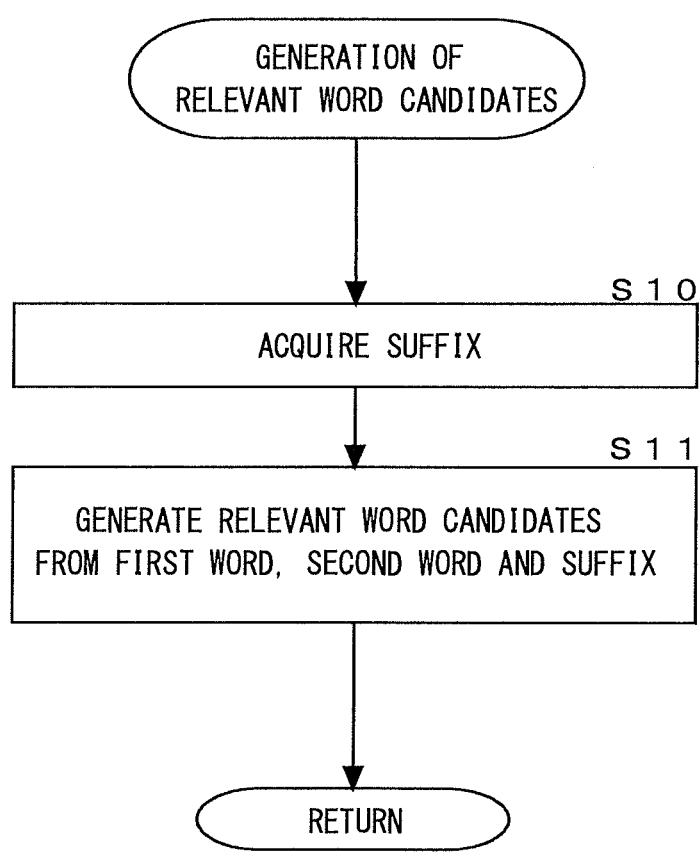
FIG. 8 is a flowchart illustrating a subroutine of generating a relevant word candidate of FIG. 5.
Figure 9:
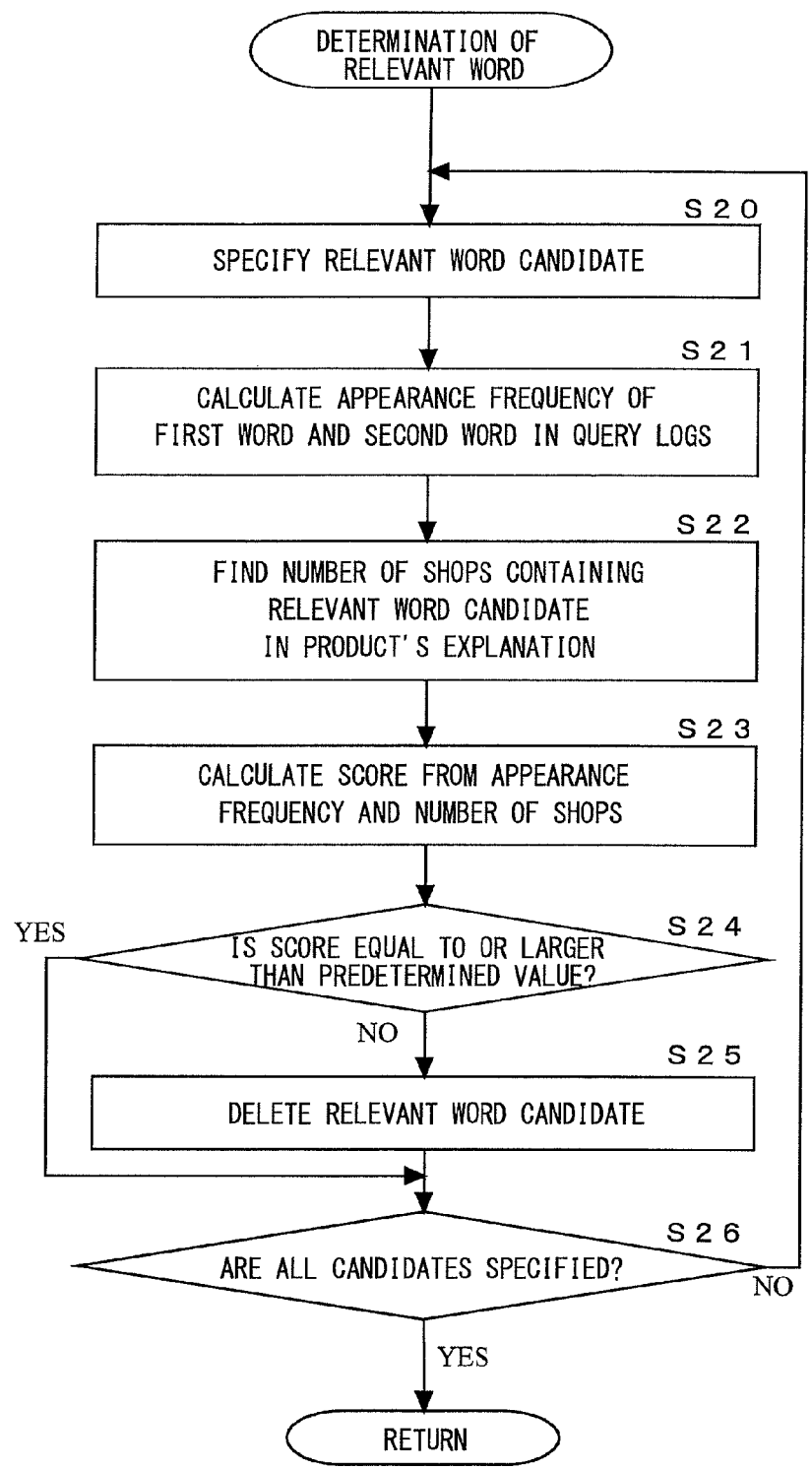
FIG. 9 is a flowchart illustrating a subroutine of determining a relevant word of FIG. 5.

FIG. 6 is a flowchart illustrating exemplary operations of the information processing server 10. FIG. 7 is a schematic diagram illustrating exemplary search results by the information processing server 10. FIG. 8 is a flowchart illustrating a subroutine of generating a relevant word candidate. FIG. 9 is a flowchart illustrating a subroutine of determining a relevant word.

(3.1 Exemplary Operations of Information Processing System)

At first, the user searching a product inputs, for example, "JITENSHA" (bicycle) on a web page for product search displayed on the display unit 33 in the user terminal device 30. When a search button on the web page is clicked, the user terminal device 30 transmits the search keyword to the information processing server 10.

The information processing server 10 acquires a first word (step S1). Specifically, the system control unit 14 in the information processing server 10 receives the search keyword from the user terminal device 30, and assumes the received search keyword as a first word. In this way, the system control unit 14 in the information processing server 10 functions as an exemplary first word acquiring means that acquires the first word as a first search keyword.

Next, the information processing server 10 acquires a second word (step S2). Specifically, the system control unit 14 in the information processing server 10 acquires a second word used together with the first word with reference to the query log DB 12d. When the first word is "JITENSHA" (bicycle), the system control unit 14 in the information processing server 10 acquires the second words such as "HERUMETTO" (helmet), "RAITO" (light), and "KODOMO" (child) with reference to query log DB 12d. In this way, the system control unit 14 in the information processing server 10 functions as an exemplary second word acquiring means that acquires a second word different from the first word.

Next, the information processing server 10 generates a relevant word candidate (step S3). Specifically, the system control unit 14 in the information processing server 10 combines a character string of the first word and a character string of the second word thereby to generate relevant word candidates associated with the first word in the subroutine processing of generating a relevant word candidate. The generated relevant word candidates are stored in the storage unit 12 or the RAM 14c. There are generated herein, as exemplary relevant word candidates, relevant word candidates such as "JITENSHA YOU HERUMETTO" (helmet for bicycle), "KODOMO YOU JITENSHA" (bicycle for children), "JITENSHA TSUKI HERUMETTO" (helmet with bicycle), and "JITENSHA HERUMETTO" (bicycle-helmet) in combination of a character string of the first word ("JITENSHA" (bicycle)) and character strings of the second words ("HERUMETTO" (helmet) and "KODOMO" (child)). Incidentally, the generation of relevant word candidates will be described in detail in the subroutine of generating a relevant word candidate.

Next, the information processing server 10 determines a relevant word from the candidates (step S4). Specifically, the system control unit 14 in the information processing server 10 calculates a score for each relevant word candidate and determines a relevant word having a predetermined value score or more from the generated relevant word candidates. If the scores of "JITENSHA YOU HERUMETTO" (helmet for bicycle) and "KODOMO YOU JITENSHA" (bicycle for children) are higher than a predetermined value and the score of "JITENSHA TSUKI HERUMETTO" (helmet with bicycle) is lower than the predetermined value, "JITENSHA YOU HERUMETTO" (helmet for bicycle) and "KODOMO YOU JITENSHA" (bicycle for children) are determined as relevant words. In this way, the system control unit 14 in the information processing server 10 functions as an exemplary relevant word generating means that generates a plurality of relevant words associated with the first word acquired by the first word acquiring means and containing the character string of the first word. Incidentally, the determination of relevant words will be described in detail in the subroutine of determining a relevant word.

Next, the information processing server 10 acquires a first search result using the first word as a search keyword (step S5). Specifically, the system control unit 14 in the information processing server 10 searches the product DB 12a based on the first word, and acquires a first search result. For example, a search result using the search keyword "JITENSHA" (bicycle) is acquired.

Next, the information processing server 10 acquires a second search result using the relevant word as a search keyword (step S6). Specifically, the system control unit 14 in the information processing server 10 searches the product DB 12a based on each relevant word, and acquires a second search result. For example, every search result using the search keyword "JITENSHA YOU HERUMETTO" (helmet for bicycle) and "KODOMO YOU JITENSHA" (bicycle for children) is acquired. Incidentally, the system control unit 14 in the information processing server 10 may acquire the search results via the network 3.

In this way, the system control unit 14 in the information processing server 10 functions as an exemplary search result acquiring means that acquires a first search result using the first word as a search keyword and a second search result using the relevant word generated by the relevant word generating means as a search keyword.

Next, the information processing server 10 removes the second search result from the first search result (step S7). Specifically, the system control unit 14 in the information processing server 10 deletes a common part with the second search result from the first search result to be part of the first search result. More specifically, the system control unit 14 in the information processing server 10 compares respective elements (such as individual products) of the search results hit in the searching between the first search result and the second search result, and deletes the same elements as those in the second search result from the elements of the first search result. For example, the system control unit 14 in the information processing server 10 compares URLs (Uniform Resource Locator), product names, or the like of the respective elements of the search results thereby to delete the same elements, and thus removes the search results with the relevant words "JITENSHA YOU HERUMETTO" (helmet for bicycle) and "KODOMO YOU JITENSHA" (bicycle for children) as search words from the search result using the search keyword "JITENSHA" (bicycle). Incidentally, when the first search result is acquired, a search equation for removing each relevant word in the searching with the first word is generated and a search is made, and thus the step may be omitted.

In this way, the system control unit 14 in the information processing server 10 functions as an exemplary search result information generating means that generates search result information so as to display a search result using the second search result removed from the first search result, as at least part of the first search result.

Next, the information processing server 10 generates search result information in which part of the first search result and the second search result are discriminated to be displayed on the screen (step S8). Specifically, as illustrated in FIG. 7, the system control unit 14 in the information processing server 10 generates a web page 40 (exemplary search result information) described in HTML or the like in order to discriminate part of a first search result 41 from a second search result 42 and display them on the display unit 33 in the user terminal device 30. Part of the first search result 41 and the second search result 42 are displayed in discriminated regions in the web page 40. Herein, a product (product in the second search result 42) common with the products in the search result using the relevant word "JITENSHA YOU HERUMETTO" (helmet for bicycle) or the like is deleted from part of the first search result 41 and elements 41a in individual search results are grouped. The second search result 42 is configured in which a search result 43 with the relevant word "JITENSHA YOU HERUMETTO" (helmet for bicycle), a search result 44 with the relevant word "JITENSHA YOU RAITO" (light for bicycle) and a search result 45 with the relevant word "KODOMO YOU JITENSHA" (bicycle for children) are grouped. The search results 43, 44 and 45 are configured of elements 43a, 44a and 45a of the search results, respectively. A search result is displayed in accordance with a relevant word "JITENSHA YOU HERUMETTO" (helmet for bicycle) or "JITENSHA YOU RAITO" (light for bicycle) in the second search result 42.

In this way, the information processing server 10 functions as an exemplary search result information generating means that generates search result information so as to display the search result acquired by the search result acquiring means on the screen of the displaying means in accordance with a relevant word. The information processing server 10 further functions as an exemplary search result information generating means that generates search result information so as to display at least part of the first search result acquired by the search result acquiring means and the second search result in accordance with a relevant word on the screen of the displaying means in a discriminated manner.

Next, the information processing server 10 transmits the generated search result information to the user terminal device 30. Then, the system control unit 36 in the user terminal device 30 receives the search result information, and displays the web page 40 of the search results as in FIG. 7 on the display unit 33.

(3.2 Subroutine of Generating Relevant Word Candidate)

A subroutine of generating a relevant word candidate will be described using FIG. 8.

FIG. 8 is a flowchart illustrating the subroutine of generating a relevant word candidate.

As illustrated in FIG. 8, the information processing server 10 acquires a suffix (step S10). Specifically, the system control unit 14 in the information processing server 10 reads "YOU" (for), "TSUKI" (with), "SEI" (made of), "SAN" (produced in), "KATA" (type), "BAN" (board), "BAN" (version), "GARA" (pattern), "IRO" (color) or the like as a suffix character (exemplary intermediate character) with reference to the suffix DB 12e.

Next, the information processing server 10 generates relevant word candidates from the first word, the second word and the suffix (step S11). Specifically, the system control unit 14 in the information processing server 10 generates relevant word candidates in combination of the read suffix character, the first word and the second word with reference to the suffix DB 12e. The suffix word is placed between the first word and the second word thereby to generate relevant word candidates. For example, when the first word is "JITENSHA" (bicycle) and the second word is "HERUMETTO" (helmet), exemplary relevant words such as "JITENSHA YOU HERUMETTO" (helmet for bicycle), "JITENSHA TSUKI HERUMETTO" (helmet with bicycle), "JITENSHA SEI HERUMETTO" (helmet made of bicycle), . . . , "HERUMETTO YOU JITENSHA" (bicycle for helmet), . . . , and "HERUMETTO SEI JITENSHA" (bicycle made of helmet) are generated. At this time, a relevant word candidate can be generated even in an arrangement of the second word, the suffix character and the first word in this order such as "HERUMETTO YOU JITENSHA" (bicycle for helmet). "JITENSHA YOU RAITO" (light for bicycle), "JITENSHA TSUKI RAITO" (light with bicycle), . . . , "KODOMO YOU JITENSHA" (bicycle for children) and the like are generated in addition to "HERUMETTO" (helmet). Incidentally, the relevant word candidates may be "JITENSHARAITO" (bicycle-light) and "JITENSHA HERUMETTO" (bicycle-helmet) which do not contain a suffix character.

When terminating the subroutine, the information processing server 10 performs the processing in step S4. In this way, the system control unit 14 in the information processing server 10 functions as an exemplary relevant word candidate generating means that generates candidates containing a combination of a character string of the first word and a character string of the second word. The system control unit 14 in the information processing server 10 functions as an exemplary relevant word candidate generating means that generates candidates by an intermediate character between the first word and the second word.

(3.3 Subroutine of Determining Relevant Word)

A subroutine of determining a relevant word will be described using FIG. 9.

FIG. 9 is a flowchart illustrating the subroutine of determining a relevant word.

As illustrated in FIG. 9, the information processing server 10 specifies a relevant word candidate (step S20). Specifically, the system control unit 14 in the information processing server 10 sequentially specifies one relevant word candidate (such as "JITENSHA YOU HERUMETTO" (helmet for bicycle)) from the relevant word candidates generated in step S3 and stored in the storage unit 12 or the RAM 14c.

Next, the information processing server 10 calculates an appearance frequency of the first word and the second word in the query logs (step S21). Specifically, the system control unit 14 in the information processing server 10 calculates an appearance frequency $N_{k1,\ k2}$ at which the first word and the second word appear together with reference to the query log DB 12d. Herein, k1 indicates the first word and k2 indicates the second word. For example, as illustrated in FIG. 3, when the first word is "JITENSHA" (bicycle) and the second word is "HERUMETTO" (helmet), the system control unit 14 in the information processing server 10 reads data with the first word "JITENSHA" (bicycle) and the second word "HERUMETTO" (helmet) from the query log DB 12d, and assumes the appearance frequency $N_{k1,\ k2}$.

Next, the information processing server 10 finds the number of shops which contain a relevant word candidate in the product's explanation (step S22). Specifically, the system control unit 14 in the information processing server 10 specifies a product with the specified relevant word candidate (such as "JITENSHA YOU HERUMETTO" (helmet for bicycle)) or a product using a relevant word candidate in the product's explanation with reference to the product DB 12a, thereby finding a product ID. Then, the system control unit 14 in the information processing server 10 counts the shops selling a product with a relevant word candidate or using a relevant word candidate in the product's explanation based on the product ID with reference to the product DB 12b, thereby calculating the number of shops $M_{k1, s, k2}$. Herein, s indicates a suffix such as "YOU" (for), "TSUKI" (with), "SEI" (made of), "SAN" (produced in), "KATA" (type), "BAN" (board), "BAN" (version), "GARA" (pattern), "IRO" (color), "for", "with", "in", or "for the purpose of".

Next, the information processing server 10 calculates a score from the appearance frequency and the number of shops (step S23). Specifically, the system control unit 14 in the information processing server 10 calculates a score Score(k1, s, k2) as a function of the first word, the suffix and the second word according to the equation Score(k1, s, k2)= $\log(N_{k1, k2}) \times \log(M_{k, s, k2})$ with the appearance frequency $N_{k1, k2}$ and the number of shops $M_{k1, s, k2}$.

Next, the information processing server 10 determines whether the score is a predetermined value or more (step S24). Specifically, the system control unit 14 in the information processing server 10 determines whether the calculated score Score is a predetermined value or more. Herein, when the first word k1 and the second word k2 are frequently used by the user for searching a product and the relevant word (k1, s, k2) is frequently used in each shop, the sore Score(k1, s, k2) indicates a high value. $\log(N_{k1, k2})$ indicates a state of product demand and $\log(M_{k1, s, k2})$ indicates a state of product supply.

Next, when the score is not a predetermined value or more (NO in step S24), the information processing server 10 deletes the relevant word candidate (step S25). Specifically, when the score Score(k1, s, k2) is lower than the predetermined value, the system control unit 14 in the information processing server 10 deletes the relevant word candidate from the storage unit 12 or the RAM 14c since the relevant word candidate is not suitable as a relevant word.

When the sore is a predetermined value or more (YES in step S24), the information processing server 10 does not delete the specified relevant word candidate, and proceeds to a processing in step S26.

In this way, the system control unit 14 in the information processing server 10 functions as an exemplary relevant word determining means that finds the number of shops which sell the product by containing a relevant word candidate generated by the relevant word candidate generating means in the product's explanation, and determines a relevant word in accordance with the number of shops. The system control unit 14 in the information processing server 10 functions as an exemplary relevant word determining means that determines a relevant word in accordance with the number of appearances at which the first word appears in a predetermined database. The system control unit 14 in the information processing server 10 functions as an exemplary relevant word determining means that determines a relevant word in accordance with the number of hit searches using a relevant word candidate generated by the relevant word candidate generating means as a search keyword.

Next, the information processing server 10 determines whether all the candidates are specified (step S26). Specifically, the system control unit 14 in the information processing server 10 determines whether all the relevant word candidates stored in the storage unit 12 or the RAM 14c are specified.

When all the candidates are not specified (NO in step S26), the information processing server 10 proceeds to the processing in step S20.

When all the candidates are specified (YES in step S26), the information processing server 10 terminates the processings in the subroutine, and performs the processing in step S5.

As described above, according to the present embodiment, a plurality of relevant words associated with the first word acquired as a search keyword and containing a character string of the first word are generated, the first search result using the first word as a search keyword and the second search result using the generated relevant word as a search keyword are acquired, and the web page 40 (exemplary search result information) is generated so as to display the acquired search results on the screen of the display unit 33 (exemplary displaying means) in accordance with each relevant word in a discriminated manner, thereby reducing mixture of targets to be searched by the search keywords for display.

When relevant word candidates are generated from the first word and a relevant word is determined from the candidates, a more appropriate relevant word can be generated from the generated candidates.

When the number of shops which sell the product by containing a generated relevant word candidate in the product's explanation is found and a relevant word is determined in accordance with the number of shops, a more appropriate relevant word, which is generally used on the shopping site managed by the information processing server 10 or on the network, can be generated.

When a relevant word is determined in accordance with the number of appearances (such as appearance frequency $N_{k1, k2}$) at which the first word appears in a predetermined database such as the query log DB 12d, a more appropriate relevant word can be generated from the first word generally used on the shopping site or the network.

When a second word different from the first word is acquired and relevant word candidates containing a combination of a character string of the first word and a character string of the second word are generated, a more appropriate relevant word can be generated. Many relevant word candidates can be generated in combination of the first word and the second word, and the candidates can be narrowed to a more appropriate relevant word. Further, more relevant word candidates can be generated in combination of the first word, the second word and an intermediate character.

When search result information is generated so as to display, as at least part of the first search result, a search result in which the second search result is removed from the first search result, mixture of the first search result and the second search result is eliminated and a relevant product of the second search result can be easily found. Further, the user can easily find a search result by the relevant word.

Incidentally, the present embodiment can be used when a product is registered, a check is made as to whether a product name to be registered is proper, or a proper product name of a relevant product is found in the shop terminal device 20. The first word is transmitted from the shop terminal device 20 to the information processing server 10, and the information processing server 10 determines a relevant word in S4. Then, the information processing server 10 transmits the relevant word determined in S4 to the shop terminal device 20. The relevant word is displayed on the display unit 23 in the shop terminal device 20.

[4. Modified Examples of Display]

Modified examples of search result display by the information processing server will be described using FIGS. 10, 11 and 12.

Figure 10:
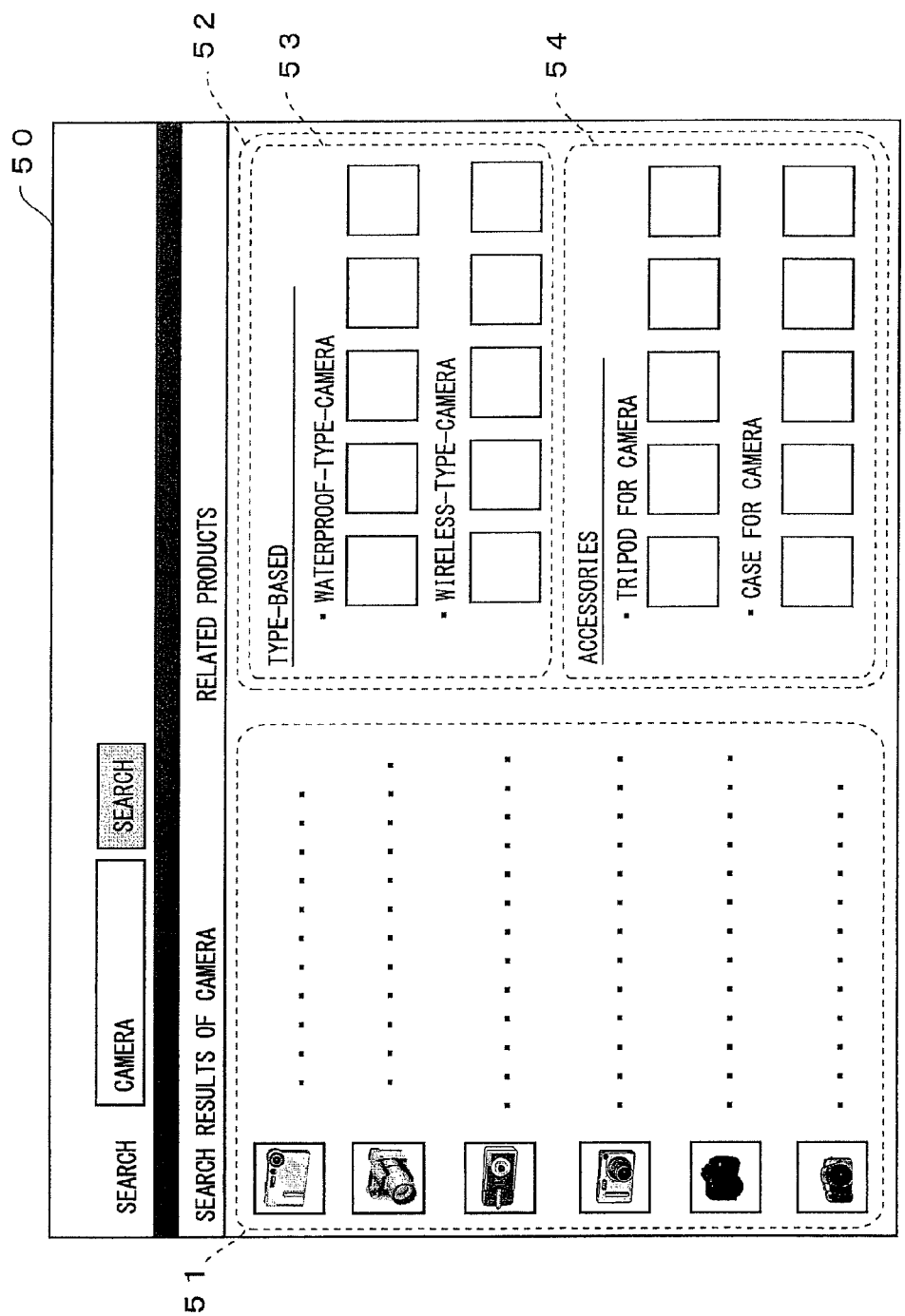
FIG. 10 is a schematic diagram illustrating a modified example of search results by the information processing server of FIG. 1.
Figure 11:
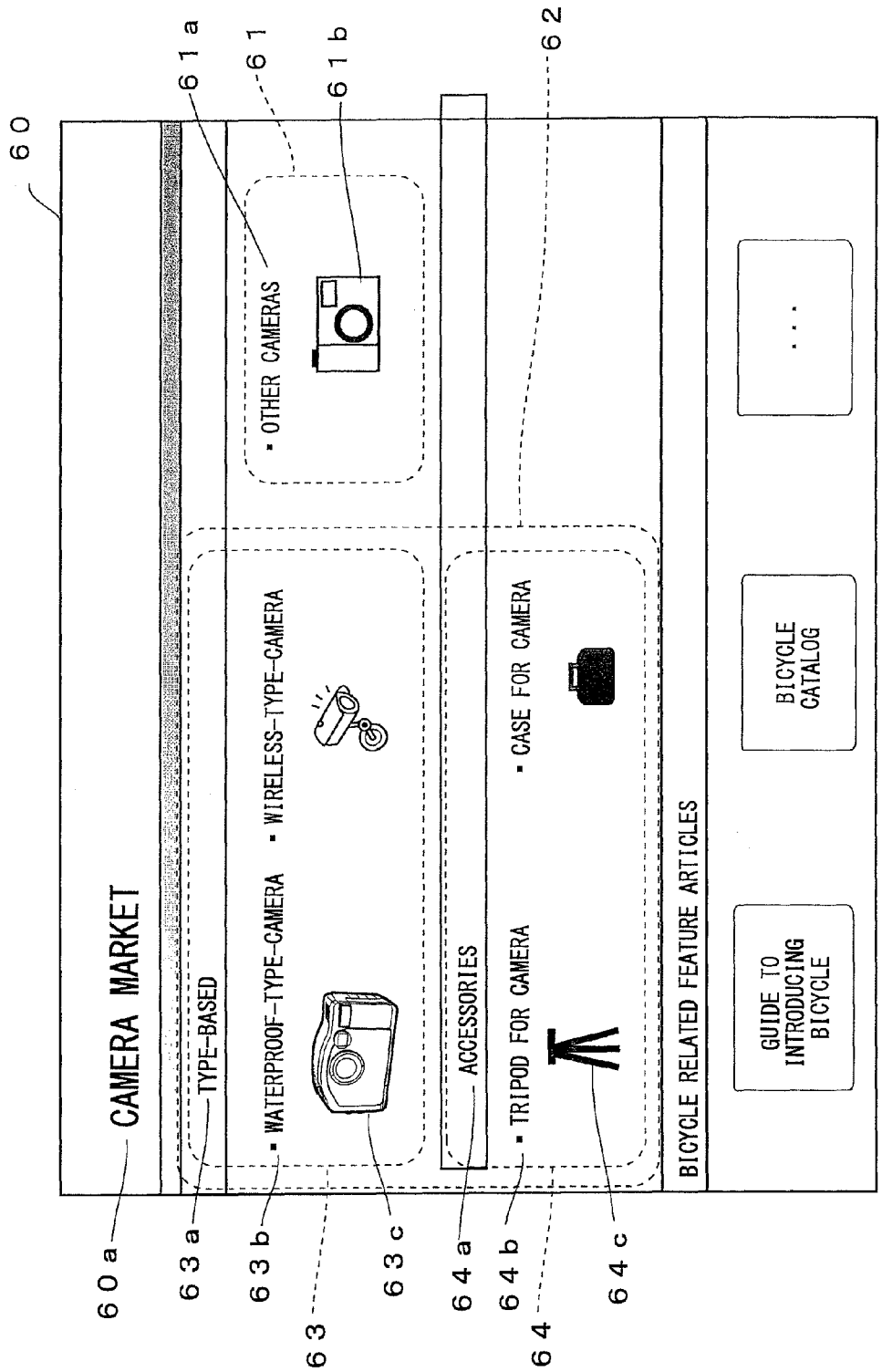
FIG. 11 is a schematic diagram illustrating a modified example of search results by the information processing server of FIG. 1.

FIGS. 10 and 11 are schematic diagrams illustrating modified examples of search result by the information processing server, respectively. FIG. 12 is a flowchart illustrating a modified example of the operations of the information processing server.

[4.1 First Modified Example of Display]

A first modified example of display will be first described using FIG. 10.

As illustrated in FIG. 10, the system control unit 14 in the information processing server 10 may generate a web page 50 so as to discriminate part of a first search result 51 from a second search result 52 and to display search results 53 and 54 in which the second search result 52 is grouped per suffix character.

Part of the first search result 51 and the second search result 52 are displayed in discriminated regions in the web page 50. Herein, part of the first search result 51 is configured, from which the products displayed in the second search result 52 on type-based products with the relevant words "BOSUI GATA KAMERA" (waterproof-type-camera) and "WAIYARESU GATA KAMERA" (wireless-type-camera) and accessories with the relevant words "KAMERA YOU SANKYAKU" (tripod for camera) and "KAMERA YOU KEISU" (case for camera) are deleted. The second search result 52 is configured of the search result 53 on type-based products and the search result 54 on accessory products described in the suffix "YOU" (for). Incidentally, the first word is "KAMERA" (camera).

The search result 53 on type-based products is configured of a search result using the relevant word "BOSUI GATA KAMERA" (waterproof-type-camera) and a search result using the relevant word "WAIYARESU GATA KAMERA" (wireless-type-camera). The search result 54 on accessories is configured of a search result using the relevant word "KAMERA YOU SANKYAKU" (tripod for camera) and a search result using the relevant word "KAMERA YOU KEISU" (case for camera).

As illustrated in FIG. 10, when candidates are generated from an intermediate character between the first word and the second word and search result information is generated so as to group and display the second search result per intermediate character on the screen of the displaying means, the grouping is performed per intermediate character and the search results are classified, thereby displaying relevant products. For example, the intermediate character "YOU" (for) or "for" indicates use application in many cases and thus use application-based relevant products can be displayed together, and the intermediate character "SAN" (produced in) indicates a production area and thus production area-based relevant products can be displayed together.

The second search result 52 is displayed in a different region from the first search result and is grouped per intermediate character in the web page 50, and thus the relevant products associated with the first word can be easily found. When there are many relevant products, each relevant product can be easily found.

In this way, the system control unit 14 in the information processing server 10 functions as an exemplary search result information generating means that generates search result information so as to group and display the second search result per intermediate character on the screen of the displaying means.

Incidentally, in step S21, when calculating the appearance frequency $N_{k1, k2}$, the system control unit 14 in the information processing server 10 may find the number of hits with the first word and the second word as search keywords (such as "JITENSHA HERUMETTO" (bicycle-helmet)) in the product DB 12a as an exemplary predetermined database instead of the query log DB 12d, thereby obtaining the appearance frequency $N_{k1, k2}$.

When the appearance frequency $N_{k1, k2}$ and the number of shops $M_{k1, s, k2}$ are found, the appearance frequency or the number of shops on the network 3, not limited to the shopping site of the information processing server 10, may be found. For example, when the number of shops on the network 3 is found, a search is made with the relevant word candidate "JITENSHA YOU HERUMETTO" (helmet for bicycle) and URLs where the products are sold may be counted.

In step S22, the system control unit 14 in the information processing server 10 may find the number of hit searches using a generated relevant word candidate as a search keyword. The number of hit searches may be the number of hits in the product DB 12a or may be the number of hits on the network 3. The system control unit 14 in the information processing server 10 calculates Score(k1, s, k2) from the number of hits instead of $M_{k1, s, k2}$. Score(k1, s, k2) may be calculated from the number of hits, the appearance frequency $N_{k1, k2}$ and the number of shops $M_{k1, s, k2}$.

When a relevant word is determined in accordance with the number of hit searches using a generated relevant word candidate as a search keyword, a relevant word generally used on the shopping site or the network can be determined thereby to generate a more appropriate relevant word.

The system control unit 14 in the information processing server 10 may extract the second words "HERUMETTO" (helmet) and "KODOMO" (child) from the stored first words "JITENSHA YOU HERUMETTO" (helmet for bicycle) and "KODOMO YOU JITENSHA" (bicycle for children), for example, with reference to the query log DB 12d.

The first words containing the first word "JITENSHA" (bicycle) in the query log DB 12d may be assumed as relevant words. For example, the system control unit 14 in the information processing server 10 extracts "JITENSHA YOU HERUMETTO" (helmet for bicycle) and "KODOMO YOU JITENSHA" (bicycle for children) stored in the first word area in the query log DB 12d as relevant word candidates from the first word "JITENSHA" (bicycle).

(4.2 Second Modified Example of Display)

A second modified example of display will be described using FIGS. 11 and 12.

As illustrated in FIG. 11, the information processing server 10 may generate a web page 60 which is a feature page associated with the first word. The web page 60 has a feature title 60a indicating a feature article, and a second search result 62 by a relevant word. The second search result 62 has search results 63 and 64 grouped per suffix character. Incidentally, the feature title 60a indicating a feature article is generated from the first word "KAMERA" (camera).

The search result 63 is a search result on type-based products based on the suffix "KATA" (type), for example, and contains a search result by a relevant word containing the suffix "KATA" (type). The search result 63 has a classification title 63a based on the suffix, a product title 63b based on the relevant word, and a product image 63c.

The search result 63 is configured of a search result (product image 63c) with the relevant word "BOSUI GATA KAMERA" (waterproof-type-camera) and a search result (product image 63c) with the relevant word "WAIYARESU GATA KAMERA" (wireless-type-camera). Incidentally, the product image 63c is an image of the top product hit in the searching with each relevant word.

The search result 64 is a search result on accessory products described with the suffix "YOU" (for), for example, and contains a search result by a relevant word containing the suffix "YOU" (for). The search result 64 has a classification title 64*a* based on the suffix, a product title 64*b* with the relevant word, and a product image 64*c*.

The search result 64 is configured of a search result (product image 64*c*) with the relevant word "KAMERA YOU SANKYAKU" (tripod for camera), and a search result (product image 64*c*) with the relevant word "KAMERA YOU KEISU" (case for camera). Incidentally, the product image 64*c* is an image of the top product hit in the searching with each relevant word, for example.

As described above, the search result is displayed in accordance with the relevant word "BOSUI GATA KAMERA" (waterproof-type-camera) or "KAMERA YOU SANKYAKU" (tripod for camera) on the web page 60. Further, the search results 63 and 64 grouped in accordance with the suffix as part of the relevant word are displayed on the web page 60.

Incidentally, as illustrated in FIG. 11, part of the first search result 61 may be displayed on the same level position as the type-based search result 63 in a discriminated manner. The classification title 61*a* is generated based on the first word. The product image 61*b* is generated as exemplary part of the first search result from the search result in which the second search result is removed from the first search result based on the first word. Then, part of the first search result 61 and the second search result 62 are displayed in discriminated regions on the web page 50.

In this way, the information processing server 10 functions as an exemplary search result information generating means that generates search result information so as to discriminate and display at least part of the first search result acquired by the search result acquiring means and the second search result associated with a relevant word on the screen of the displaying means.

A modified example of the operations for displaying the web page 60 will be described below.

Figure 12:
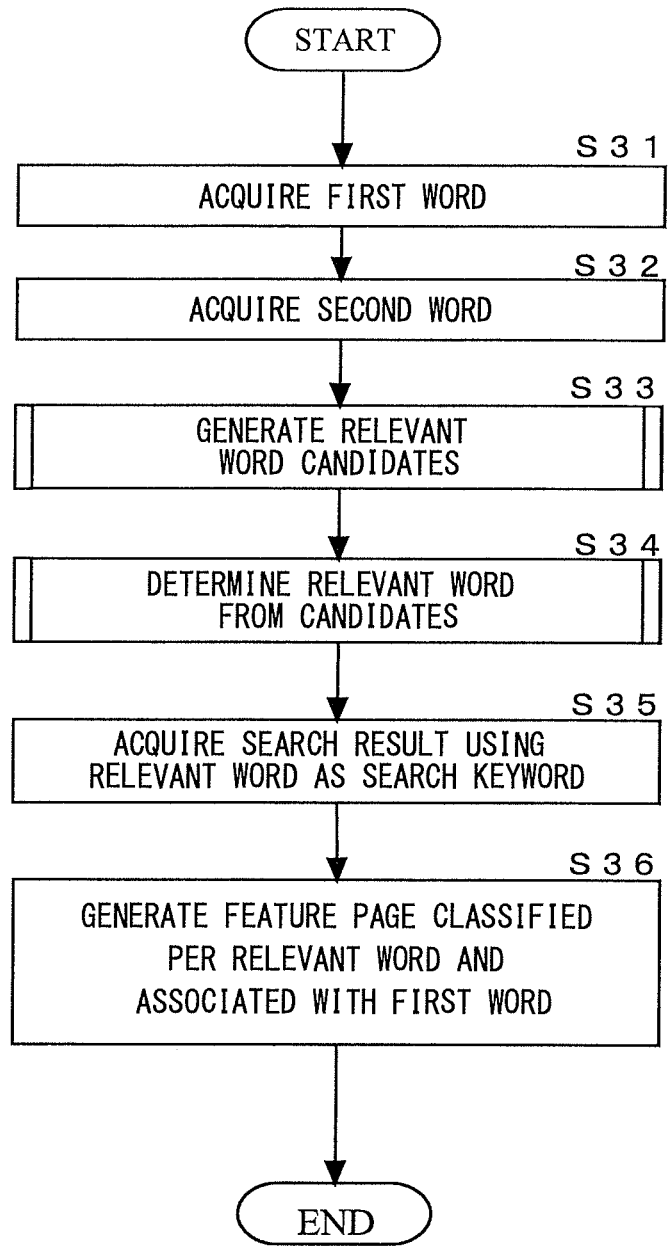
FIG. 12 is a flowchart illustrating a modified example of the operations of the information processing server of FIG. 1.

As illustrated in FIG. 12, the information processing server 10 acquires a first word (step S31). Specifically, the system control unit 14 in the information processing server 10 acquires the first word "KAMERA" (camera) from the operation unit (not illustrated) in the information processing server 10 or a terminal (not illustrated) via the local area network connected with the information processing server 10 in order to generate a feature page on the first word.

Next, the information processing server 10 acquires a second word as in step S2 (step 32).

Next, the information processing server 10 generates relevant word candidates as in step S3 (step S33).

Next, the information processing server 10 determines a relevant word from the candidates as in step S4 (step S34).

Next, the information processing server 10 acquires a search result using each relevant word as a search keyword (such as a second search result by a relevant word) as in step S6 (step S35).

Next, the information processing server 10 generates a feature page on the first word classified per relevant word (step S36). As illustrated in FIG. 11, the system control unit 14 in the information processing server 10 first generates a feature title 60*a* indicating a feature article based on the acquired first word. Incidentally, a synonym (such as "SHASINKI" (photographic camera)) of the first word "KAMERA" (camera) may be used for the feature title 60*a*.

Then, the system control unit 14 generates classification titles 63*a* and 64*a* based on relevant words' suffixes. The system control unit 14 generates product titles 63*b* and 64*b* based on relevant words. The system control unit 14 generates product images 63*b* and 64*c* of the top products in the searching order, for example, based on search results (such as the second search result) using the relevant words as search keywords. Incidentally, information on the product may be generated instead of the product images. A plurality of product images in the search result to be displayed may be generated, not only one image.

The system control unit 14 arranges the feature title 60*a*, the classification titles 63*a*, 64*a*, the product titles 63*b*, 64*b*, and the product images 63*c*, 64*c* thereby to generate the web page 60. Particularly, the system control unit 14 arranges the search results 63 and 64 in accordance with relevant words' suffixes (classification titles 63*a* and 64*a*). Then, the system control unit 14 arranges the product pages 63*c* and 64*c* in accordance with the relevant words (product titles 63*b* and 64*b*). The search results are arranged and displayed in accordance with the relevant words' suffixes or the relevant words, and thus the targets associated with the words can be arranged and mixture of the targets associated with the words is reduced for display.

In this way, the information processing server 10 functions as an exemplary search result information generating means that generates search result information so as to display the search results acquired by the search result acquiring means on the screen of the displaying means in accordance with a relevant word.

Incidentally, the information processing server 10 may generate part of the first search result 61 by finding the first search result using the first word as a search keyword as in step S5, and removing the second search result from the first search result as in step S7.

Then, the information processing server 10 can reduce mixture of the targets to be searched by a search keyword for display, by discriminating and displaying part of the first search result 61 and the second search result 62 associated with a relevant word as in the web page 60.

In this way, the information processing server 10 functions as an exemplary search result information generating means that generates search result information so as to discriminate and display at least part of the first search result acquired by the search result acquiring means and the second search result associated with a relevant word on the screen of the displaying means.

Furthermore, the present invention is not limited to the embodiment. The above embodiment is exemplary, and any invention having substantially the same structure as the technical spirit described in Claims of the present invention and demonstrating the same operational effects is encompassed in the technical scope of the present invention.

EXPLANATION OF REFERENCE NUMERALS

1: Information processing system
3: Network
10: Information processing server (information processing device)
12*a*: Product DB (predetermined database)
12*b*: Shop DB (predetermined database)
12*d*: Query log DB (predetermined database)
12*e*: Suffix DB (predetermined database)
20: Shop terminal device
23: Display unit (displaying means)
30: User terminal device
33: Display unit (displaying means)
40, 50, 60: Web page (search result information)
41, 51, 61: Part of first search result
42, 52, 62: Second search result

The invention claimed is:

1. An information processing device comprising:
a first word acquiring unit that acquires a first word;
a relevant word generating unit that generates a plurality of relevant words associated with the first word acquired by the first word acquiring unit and containing a character string of the first word;
a search result acquiring unit that acquires a search result using the relevant word generated by the relevant word generating unit as a search keyword; and
a search result information generating unit that generates search result information so as to display the search result acquired by the search result acquiring unit on a screen of a displaying unit in accordance with each of the relevant words,
wherein the search result acquiring unit acquires a first search result using the first word as a search keyword and a second search result using the relevant word generated by the relevant word generating unit as a search keyword, and
the search result information generating unit generates search result information so as to discriminate and display a search result in which the second search result is removed from the first search result, and the second search result in accordance with the relevant word on the screen of the displaying unit.

2. The information processing device according to claim 1, wherein the relevant word generating unit has:
a relevant word candidate generating unit that generates candidates of the relevant words from the first word; and
a relevant word determining unit that determines the relevant word from the candidates.

3. The information processing device according to claim 2, wherein the relevant word determining unit finds a number of shops which contain a candidate of the relevant words generated by the relevant word candidate generating unit in an explanation of a product and sell the product, and determines the relevant word in accordance with the number of shops.

4. The information processing device according to claim 2, wherein the relevant word determining unit determines the relevant word in accordance with a number of appearances at which the first word appears in a predetermined database.

5. The information processing device according to claim 2, wherein the relevant word determining unit determines the relevant word in accordance with a number of hit searches using a candidate of the relevant words generated by the relevant word candidate generating unit as a search keyword.

6. The information processing device according to claim 2, comprising:
a second word acquiring unit that acquires a second word different from the first word,
wherein the relevant word candidate generating unit generates the candidates containing a combination of a character string of the first word and a character string of the second word.

7. The information processing device according to claim 6, wherein the relevant word candidate generating unit generates the candidates by intermediate characters between the first word and the second word, and
the search result information generating unit generates the search result information so as to group and display the second search result per intermediate character on the screen of the displaying unit.

8. An information processing method of an information processing device for processing information, the method comprising:
a first word acquiring step of acquiring a first word;
a relevant word generating step of generating a plurality of relevant words associated with the first word acquired in the first word acquiring step and containing a character string of the first word;
a search result acquiring step of acquiring a search result using the relevant word generated in the relevant word generating step as a search keyword; and
a search result information generating step of generating search result information so as to display the search result acquired in the search result acquiring step on a screen of a displaying unit in accordance with each of the relevant words,
wherein a first search result using the first word as a search keyword and a second search result using the relevant word generated in the relevant word generating step as a search keyword are acquired in the search result acquiring step, and
search result information is generated so as to discriminate and display a search result in which the second search result is removed from the first search result and the second search result in accordance with the relevant word on the screen of the displaying unit.

9. A non-transitory recording medium computer-readably recording a program for an information processing device therein, the program causing a computer to function as:
a first word acquiring unit that acquires a first word;
a relevant word generating unit that generates a plurality of relevant words associated with the first word acquired by the first word acquiring unit and containing a character string of the first word;
a search result acquiring unit that acquires a search result using the relevant word generated by the relevant word generating unit as a search keyword; and
a search result information generating unit that generates search result information so as to display the search result acquired by the search result acquiring unit on a screen of a displaying unit in accordance with each of the relevant words,
wherein the search result acquiring unit acquires a first search result using the first word as a search keyword and a second search result using the relevant word generated by the relevant word generating unit as a search keyword, and
the search result information generating unit generates search result information so as to discriminate and display a search result in which the second search result is removed from the first search result and the second search result in accordance with the relevant word on the screen of the displaying unit.

* * * * *